May 17, 1949.    M. E. COLLINS    2,470,291
FILM IDENTIFYING AND PUNCHING DEVICE
Filed July 4, 1945    2 Sheets-Sheet 1

MILFORD E. COLLINS,
INVENTOR.

BY
ATTORNEY.

May 17, 1949.    M. E. COLLINS    2,470,291
FILM IDENTIFYING AND PUNCHING DEVICE
Filed July 4, 1945    2 Sheets-Sheet 2
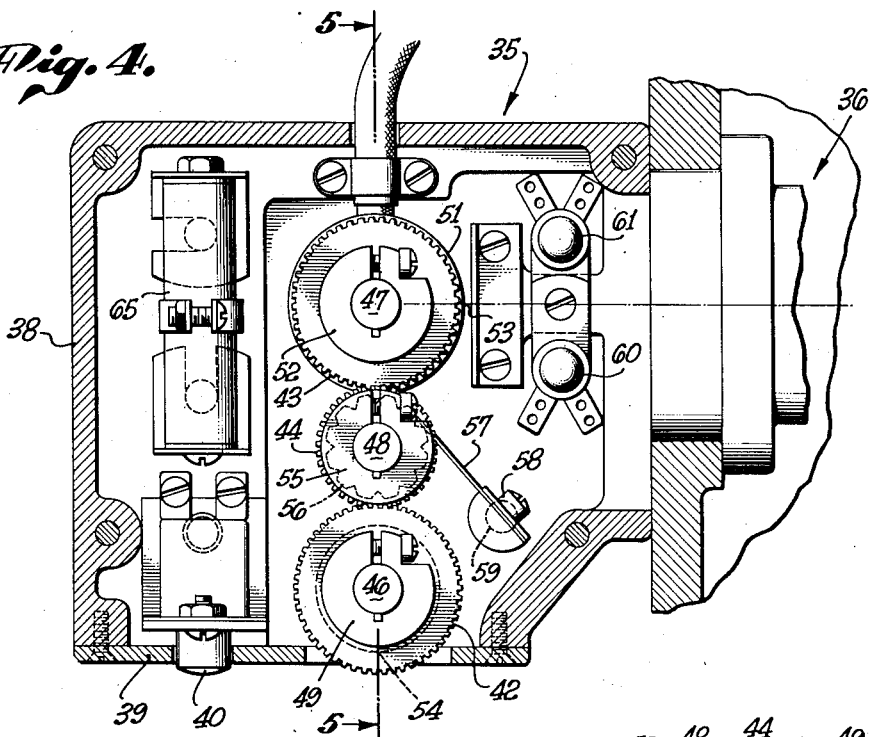
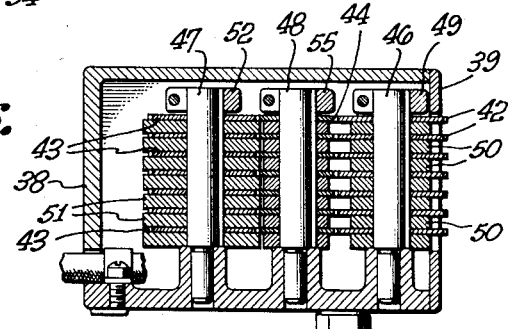
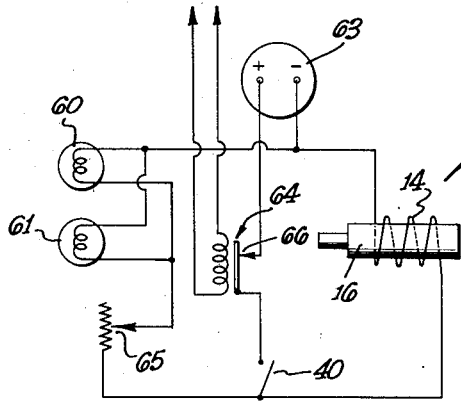
MILFORD E. COLLINS,
INVENTOR.
BY
ATTORNEY.

Patented May 17, 1949

2,470,291

UNITED STATES PATENT OFFICE 2,470,291

FILM IDENTIFYING AND PUNCHING DEVICE

Milford E. Collins, Los Angeles, Calif., assignor to Radio Corporation of America, a corporation of Delaware Application July 4, 1945, Serial No. 603,209

7 Claims. (Cl. 95—1.1)

This invention relates to sound motion picture apparatus, and particularly to a marking and identification system for film on which sound is recorded, although modifications of the invention may also be used on picture cameras or combination picture cameras and sound recorders.

In the production of motion picture films, the sequences, or "takes," are photographed and recorded in various lengths, each sequence being either a single, duplicate, or triplicate "take" of a certain scene of a complete picture and the sound thereof. On a roll of film, these "takes" are recorded in sequence during the production of a picture, many of which are known, at the time of recording, to be defective and not usable. It is desirable, therefore, to be able to identify the beginning and end of each of such sequences on the sound film in the dark room, so that they may be cut out and the unexposed portion of the film used for other purposes. The good "takes" must also be identified as to picture, type of scene, time, director, cameraman, etc., after development of the film. This is sometimes called "slating." Thus, the beginning and end of each sequence is marked, both in a manner to determine the beginning and end in the dark room, and also to fully identify the sequence after the film is developed and printed.

Many systems for accomplishing the above results have been developed and employed in the production of motion pictures, one such identifying or slating system which has been in commercial use, being disclosed and claimed in my U. S. Patent No. 2,184,546 of December 26, 1939, while another type of film marking equipment is shown in U. S. Patent No. 1,926,879 of September 12, 1933.

The present invention utilizes the general principle of the identifying apparatus shown in my prior patent, but is an improvement thereover in the manner of operation of both the film punching device and the photographing device, together with its identifying characters. Instead of being operated manually, the complete punching and photographing operations are accomplished electrically under control of a push-button. Furthermore, the arrangement of the identifying characters and their manner of adjustment and positioning in the optical path of the film is also an improvement over my prior invention.

The principal object of the invention, therefore, is to facilitate the identification of a film sequence before and/or after the recording thereof.

Another object of the invention is to provide an improved method of and system for simultaneously marking a film with a plurality of indicia for identifying one sound sequence from another on a film roll, and to provide an indication of the beginning and end of sequences in a dark room.

A further object of the invention is to facilitate the manipulation and changing of the identification indicia to be photographed on the film.

A still further object of the invention is to provide a film punching device and photographing device adapted to be simultaneously operated electrically from a remote point.

Although the novel features which are believed to be characteristic of this invention will be pointed out with particularity in the appended claims, the manner of its organization and the mode of its operation will be better understood by referring to the following description read in conjunction with the accompanying drawings forming a part hereof, in which:

Fig. 4 is an enlarged view of the mechanism for varying the indicia to be photographed.

Fig. 5 is a detail cross sectional view of the indicia varying mechanism taken along the line 5—5 of Fig. 4, and Fig. 6 is a schematic drawing of the electrical control circuit.

Figure 1:
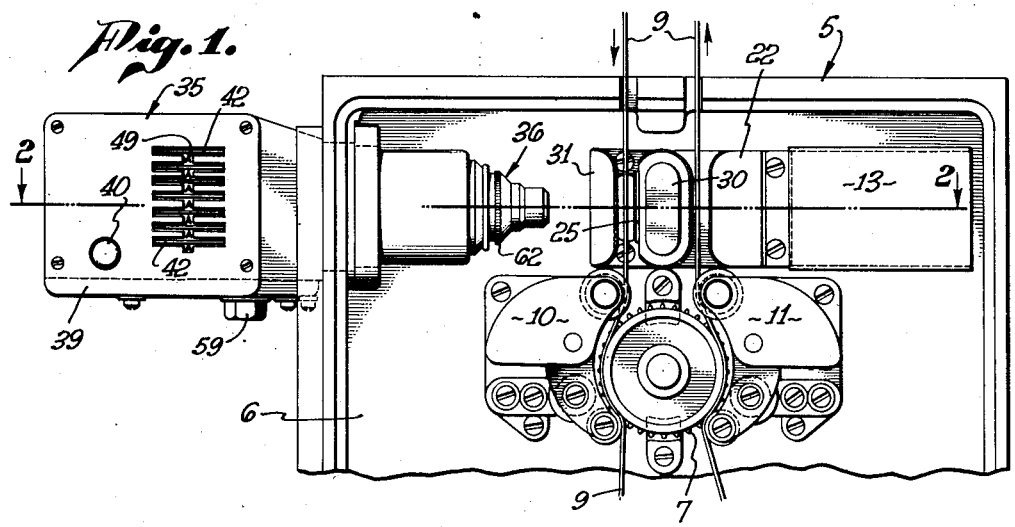
Fig. 1 is an elevational view showing a portion of a recorder film path and the relative positions of the film punching and photographic device embodying the invention on the recorder.

Referring now to the drawings, in which like elements are given identical numerals, a portion of a sound recorder is illustrated as having a casing 5 with a back supporting plate 6, on the latter of which is mounted a film feed drive sprocket 7 adapted to advance film 9 from a supply reel, not shown, past the left-hand side thereof under a pair of pad rollers on an assembly 10, and to feed film to a take-up reel, not shown, past the right-hand side thereof under a pair of pad rollers on an assembly 11. The pad roller assemblies 10 and 11 are disclosed and claimed in my U. S. Patent No. 2,418,544 of April 8, 1947, while the complete film drive is disclosed and claimed in my copending application, Ser. No. 603,210, filed July 4, 1945, now Patent 2,442,400, June 1, 1948.

Figure 2:
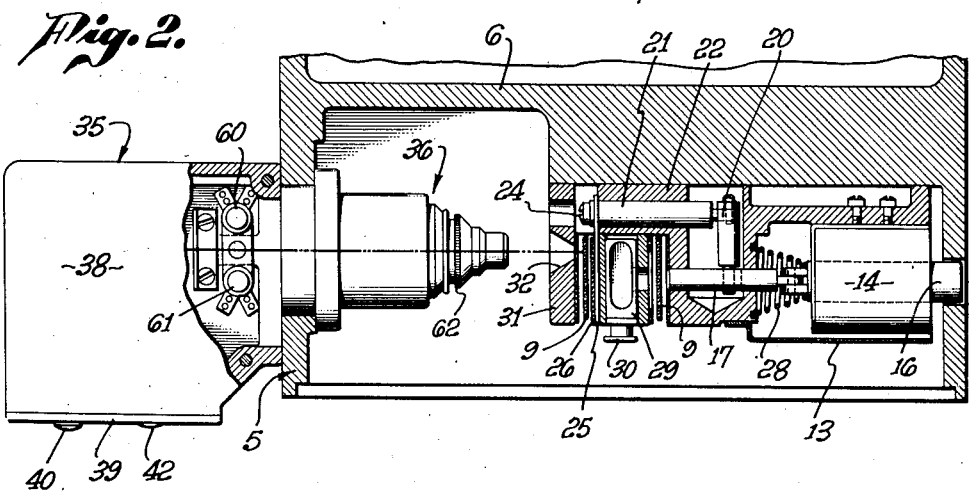
Fig. 2 is a cross sectional plan view taken along the line 2—2 of Fig. 1.

In the upper right-hand corner is shown a casing 13 with a bracket 22, the casing housing a solenoid 14 with an armature 16. The armature 16 is coupled to a cylindrical punch rod 17 shown retracted or in rest position in Fig. 2 and piercing the film 9 in Fig. 3. The film chip is shown at 18 falling into a chip box 29 having a hand knob 30, the box being removable for the disposal of the chips. Pinned near the center of the punch rod 17 in an elongated hole 23 is a cross arm 20, which, in turn, is pinned to a rod 21 parallel with the punch rod 17 and adapted to slide in an opening in the bracket 22. Mounted on the other end of the rod 21 by a screw 24 is a rectangular pressure or film focusing plate 25, on the film side of which is a felt pad 26. The movable mechanism just described is returned to its rest or inoperative position shown in Fig. 2 by a tapered coil compression spring 28 abutting a shoulder of the armature 16 and the face of the U bracket 22 in which the spring is mounted.

Figure 3:
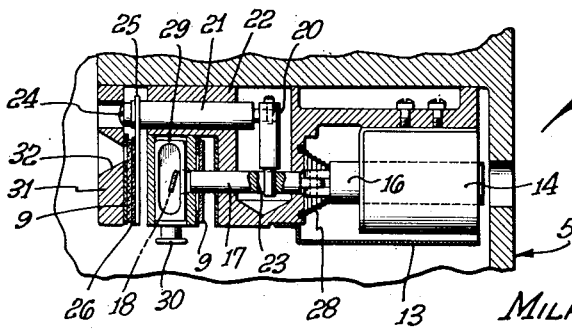
Fig. 3 is a detail cross sectional view of the film punching device during actuation.

When the solenoid 14 is energized, the armature 16 will be moved to the left, as shown in Fig. 3, the end of the punch 17 piercing the film 9 near the center thereof. Simultaneously, the pressure plate 25 is moved to the left to press the film against the face of a wall 31 of the bracket 22 so that the emulsion side of the film will be in focus with the projection of identification characters through an opening 32 in the wall 31. The elongated hole 23 in the punch rod 17 permits the armature 16 to start under a small load, the arm 20 being picked up after the rod 17 has moved the width of the hole.

Mounted on and through the left-hand wall of the casing 5, is the identification projection unit 35, the left-hand portion of which includes the identification characters and their adjusting mechanism together with the source of illumination, while the right-hand end is an optical projection unit 36. Referring now particularly to Figs. 4 and 5, the unit 35 has a casing 38 with a front cover 39 through openings in which extend a switch push-button 40 and a plurality of gear wheels 42. Within the casing 38 is a second plurality of gear wheels 43 and interconnecting intermediate mesh gears 44. The gears 42, 43, and 44 are mounted for individual rotation on shafts 46, 47, and 48, respectively, and held thereon by lock washers 49, 52, and 55, so that the rotation of any one of the gears 42 by manual manipulation thereof will correspondingly rotate the gear 43 which is meshed therewith through the respective intermediate gear 44. Attached to the sides of each of the gears 42 are indicia rings or wheels 50 bearing numerals or letters, as shown at 49 in Fig. 1. The same arrangement of letters and numerals occur on corresponding rings or wheels 51 attached to the sides of the gear wheels 43. The corresponding numeral or letter on a wheel 51 is positioned ninety degrees from its position on its visible wheel 42, so that the indicia to be photographed appear at point 53 and the visible indicia appear at point 54.

Attached to the sides of the intermediate gears 44 are notched or serrated wheels 56, shown in dotted lines in Fig. 4, each of which has a spring 57 bearing on its periphery, the spring being mounted at 58. The notches on the wheels 56 correspond in number to the numerals and letters on the wheels 50 and 51, so that proper positioning of any particular numeral or letter is obtained when the end of the spring is in a notch. By loosening a nut 59, the mounting 58 may be rotated from outside the housing 38 to adjust the tension of the springs 57 in the notches of the wheels 56. It is to be noted that the indicia wheels 51 are larger in diameter than the actuating gear wheels to which they are attached, so as not to interfere with the photographing of the indicia. On the other hand, the gear wheels 42 are larger in diameter than the indicia wheels 50, so that the gear wheels may be easily rotated or adjusted with a finger or thumb.

The indicia, as it appears on the wheels 51, is illuminated by a pair of lamps mounted at 60 and 61, the light therefrom being picked up by the objective 36 and projected on the film 9 through the opening 32 and thus photographed on the film in the sound track area. It will be thus reproduced on all the prints. To place any arrangement of numerals or letters on the film in accordance with the particular sound sequence, it is only necessary to energize the illuminating lamps after the proper letters and numerals have been positioned at point 53. To obtain the proper exposure, the optical unit 36 is provided with a 16 to 3.5 iris shutter which is adjustable by the knurled ring 62. If further light variations are required, a resistor 65 in the lamp circuit is adjusted.

To accomplish the simultaneous actions of punching the film and photographing the indicia, the push-button switch 40 need only be pressed. In Fig. 6, the circuit for the punch and for the lamps is shown, the closing of switch 40 completing two circuits, one directly from a source of supply 63 to the solenoid winding 14, and the other from the source of supply to lamps 60 and 61 through the variable resistor 65. To prevent actuation of the punch during advancement of the film, a relay 64 in the recorder drive power circuit holds a contact 66 open so that the closing of switch 40 does not energize the solenoid 14 or the lamps while power is being supplied to the recorder drive.

I claim:

1. A film marking system comprising means for advancing film, a punch adapted to punch said film when said film is stationary, energizing means for said film advancing means, a solenoid for actuating said punch, means for energizing said solenoid, and an electrical relay, means energized by said film advancing energizing means for disconnecting said solenoid energizing means from said solenoid when said film advancing energizing means is energized.

2. A film marking system comprising means for advancing film, a punch adapted to punch said film when said film is stationary, energizing means for said film advancing means, a solenoid for actuating said punch, means for energizing said solenoid, and means for disconnecting said solenoid energizing means when said film advancing energizing means is energized, said last mentioned means including a relay having a winding and contact, said winding being connected to said film advancing energizing means and said contact being connected to said solenoid energizing means.

3. A film marking system in accordance with claim 2, in which a film positioning means is provided, said means being directly actuated by said solenoid.

4. A film marking system in accordance with claim 2, in which a film positioning means and an indicia photographing means are provided, said positioning means being directly actuated by said solenoid simultaneously with the punching of said film and simultaneously with the energization of said photographing means.

5. In an identifying device for motion picture film apparatus, the combination of a conduit for guiding a film to and from a translation point, electrically actuated means for photographing indicia on said film in said conduit, means for positioning said film in a predetermined plane for photographing said indicia thereon, electrically actuated means in said conduit for removing a portion of said film, a solenoid for actuating said film removing means and said film positioning means, a manual switch for energizing said solenoid, a film advancing means, a power supply for said film advancing means, and an electrical switch for controlling the periods of actuation of said solenoid by said manual switch, said electrical switch including a relay having a winding connected to said power supply and contact elements connected in series with said manual switch.

6. In an identifying device for motion picture film apparatus, the combination of a conduit for guiding motion picture film to and from a translation point, means for advancing film through said conduit, a power supply for said film advancing means, electrically actuated means in said conduit for positioning the surface of said film, electrically actuated means for removing a portion of said film, electrically controlled means for projecting an image on said film, a solenoid for actuating said film removing means and film positioning means, a shaft for directly connecting said solenoid to said film removing means, said shaft having an aperture therein, and connecting means between said film positioning means and said shaft, one end of said connecting means being positioned in said aperture in said shaft, said shaft thereby being moveable a predetermined distance before actuation of said film positioning means, a manual switch for controlling the energization of said solenoid and said electrical image projection means, and an electrical switch having a winding in said power supply and contact elements in series with said manual switch.

7. A film marking device comprising a casing, a portion of which houses a film advancing mechanism, a bracket, a solenoid mounted on said bracket, an armature for said solenoid, a punch rod directly connected to said armature, said rod having an elongated aperture therein, a film positioning plate, a connection between said plate and said punch rod, one end of said connection being positioned in said aperture, means for electrically energizing said solenoid for simultaneously punching said film and positioning said film, said punch rod moving the length of said elongated aperture before actuation of said film positioning plate, a source of energy for said film advancing mechanism, and a switch having a winding connected to said source of energy and contact elements connected to said means for electrically energizing said solenoid.

MILFORD E. COLLINS.

REFERENCES CITED

The following references are of record in the file of this patent:

UNITED STATES PATENTS

| Number | Name | Date |
|---|---|---|
| 1,349,256 | Bechtold | Aug. 10, 1920 |
| 1,563,959 | Brewster | Dec. 1, 1925 |
| 1,580,115 | Brewster | Apr. 13, 1926 |
| 1,891,251 | Volney | Dec. 20, 1932 |
| 2,184,546 | Collins | Dec. 26, 1939 |